C. E. & R. G. CHADDOCK.
GLOVE.
APPLICATION FILED DEC. 28, 1911.
Reissued Feb. 11, 1913. 13,524.
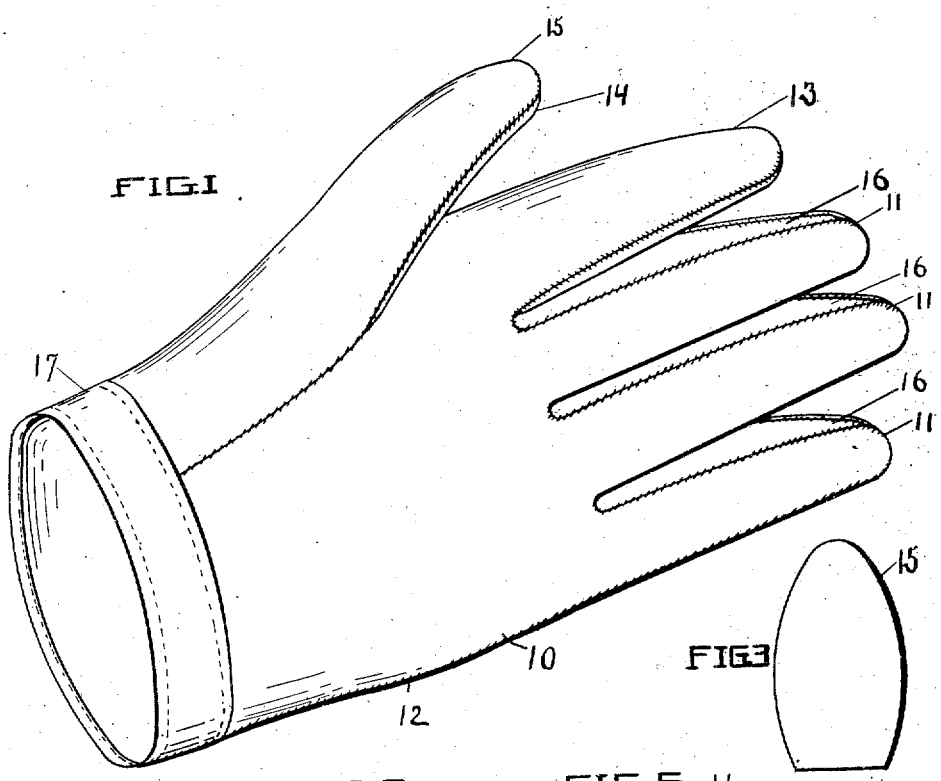
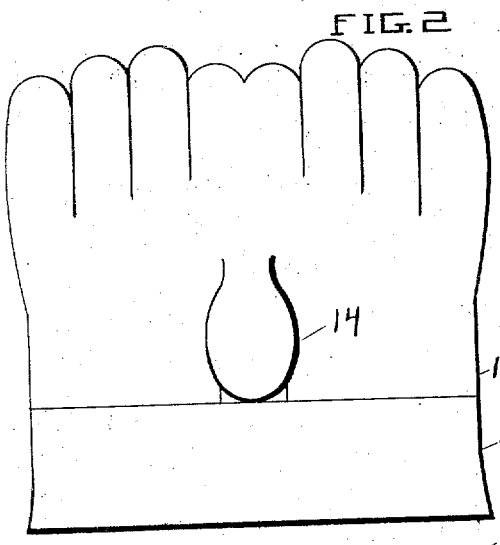
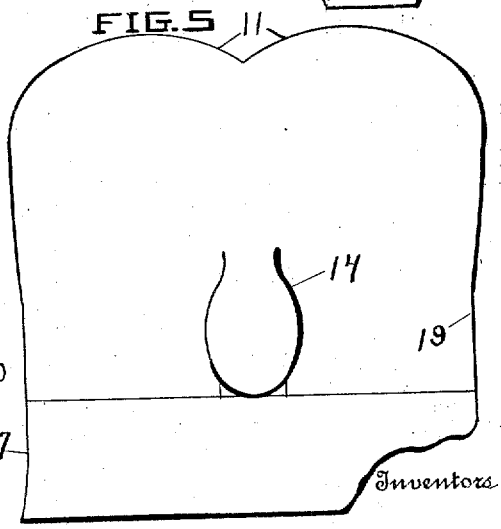
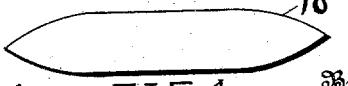
FIG.4
Witnesses
G Jamison
A H Rauch.
Inventors:
Charles E Chaddock
Richard G Chaddock
By
Geo Kirk
Attorney

UNITED STATES PATENT OFFICE.

CHARLES E. CHADDOCK, OF MAGNOLIA, AND RICHARD G. CHADDOCK, OF CLEVELAND, OHIO, ASSIGNORS OF ONE-THIRD TO GUSTAVE A. KURZ, OF ZANESVILLE, OHIO.

GLOVE.

13,524. Specification of Reissued Letters Patent. Reissued Feb. 11, 1913.

Original No. 944,357, dated December 28, 1909, Serial No. 478,200. Application for reissue filed December 28, 1911. Serial No. 668,302.

*To all whom it may concern:*

Be it known that we, CHARLES E. CHADDOCK and RICHARD G. CHADDOCK, citizens of the United States, residing, respectively, at Magnolia, Stark county, Ohio, and Cleveland, Cuyahoga county, Ohio, have invented certain new and useful Improvements in Gloves, of which the following is a specification.

This invention relates to wearing apparel and has special reference to a hand covering which is peculiarly adapted for working purposes, although it may be worn as desired.

An object of this invention is to so form a glove or mitten that the same may be manufactured from canvas, leather or any other like suitable material and one which comprises but comparatively few pieces so that the goods from which the same is made may be cut to better advantage.

The invention has for another object the provision of a glove or mitten of this description which may be applied to either hand so that the same may be reversed in order to interchange the back and the palm as the same is worn thereby producing a glove or mitten which will outlast the ordinary right or left hand article and will thus give greater service to the wearer.

The invention has for a further object the provision of a glove or mitten of this character which owing to the few parts which comprise the same, the few seams which are required to make the same and consequently the quick and easy manufacture thereof will produce a glove or mitten which can be manufactured economically and one which is of great practical advantage both to the manufacturer and the wearer.

The invention has for a still further aim the provision of fourchettes which are of such form as to produce strength and durability and thereby eliminate the necessity of applying the fourchettes of common V-formation which have not the strength required except in the formation of gloves of leather or other heavy and durable material.

For a full understanding of the invention reference is to be had to the following description and accompanying drawings, in which—

Figure 1 is a perspective view of one side of a glove embodying the invention; Fig. 2 is a side elevation of the blank from which the same is formed; Fig. 3 is a side elevation of the thumb blank. Fig. 4 is a view of one of the fourchettes employed between the finger pieces of the glove. Fig. 5 is a view of a blank of a mitten which is formed in the improved manner embodying the invention.

Corresponding and like parts are referred to in the following description and indicated in all the views of the drawings by the same reference characters.

Referring to the drawings the numeral 10 designates the blank from which the glove is formed which comprises a portion of material which is of substantially rectangular formation and which is slitted inwardly from one longitudinal edge thereof at points in substantially equi-distant relation in order to form a plurality of half-fingers 11 which are rounded at their outer extremities and cut in various lengths in order to conform to the hand and fingers of the wearer. The blank 10 is adapted to be folded over upon itself and to be stitched along the adjacent edges as at 12 to form a seam which is adapted to be positioned outwardly of the glove at the little finger side from the wrist portion of the palm or hand to the tip of the little finger. The half-fingers 11 are formed in pairs which are disposed at the opposite ends of the blank 10 so that the same will register when brought into engagement with each other upon the overlapping of the blank 10. The central finger portion 13 which is adapted for the reception of the index finger of the wearer is also cut so as to form a half-finger which is cut inwardly centrally thereof to cause the registration of the same when overlapped and to conform to the curvature of the end of the finger of the wearer. The inner or opposite longitudinal edge of the blank 10 from the seam 12 is cut so as to form a half fourchette 14 which is to be applied in the construction of the thumb and which is formed by cutting arcuate slits inwardly from the edge of the blank 10, the slits converged inwardly in order to admit of the enlarged and rounded formation of the outer end of the half fourchettes 14.

When the blank 10 is overlapped the half fourchette 14 is disposed at the folded edge of the blank and is bent upwardly and engaged between the inner edges of a thumb-piece 15 which is stitched thereto for substantially half of its length and having the inner edges thereof stitched to the inner edges of the blank 10 adjacent thereto, thus this insert 15 forms two seams from the wrist portion of the palm or hand. This arrangement and formation of the thumb piece 15 in connection with the half fourchette 14 produces a thumb on the glove which is positioned immediately at the inner edge of the same so that the glove can be worn upon either hand advantageously.

The half-fingers 11 when in registered position are attached at their inner edges to fourchettes 16 which are positioned therebetween. In this formation it is necessary to form the fingers of the glove directly outwardly from the body portion in order that the same may be bent in either direction according to the hand from which the same is worn and this construction admits of the substantially diamond formation of the fourchettes 16 which are disposed between the half-fingers 11. The object in thus forming the fourchettes 16 is in producing the same in a strong and durable form so that strains and wear upon the fourchettes will not tend to pull the same apart as is the case in gloves of common formation where the fourchettes are formed in V-shape.

The blank 10 is provided with a suitable wristband 17 which is stitched upon the inner edge of the blank 10 and upon the inner edge of the thumb-piece 15 thereby completing the glove.

In the formation of this glove it will be observed that there are substantially but five parts which compose the same and that in the production of a glove of but five parts, economy and rapidity are insured especially when the parts are of such a convenient formation as is disclosed herein.

In the drawings is disclosed a slightly modified form of the invention which comprises a formation of the blank 10 upon its outer edge with but a central cut-away portion and a rounded edge which is adapted to register upon the overlap of the blank 18 for the purpose of forming a mitten. When the blank 18 is overlapped the rounded edge of the same is registered and stitched, thereby closing the end of the same. The remaining structure of the mitten is substantially as above described in connection with the preferred form.

Having thus described the invention what is claimed as new is:

1. In an article of wearing apparel for the hand the combination of a blank, half fingers formed in one of the longitudinal edges of the same and adapted for overlapped registration, fourchettes of diamond formation stitched between said half fingers, a half fourchette stamped from said blank intermediately thereof, and a thumb piece stitched about the edges of said half fourchette and the inner edges of said blank.

2. An article of wearing apparel for the hand, formed from a blank having the forward edge thereof provided with a notch defining palm and back symmetrical portions which are folded one upon the other and stitched along their adjacent edges, there being a single half fourchette stamped from the blank, said single half fourchette being of substantially oval shape and of a size to extend to the tip of the thumb and completely fill the recess in the blank from which said half fourchette is cut, the single half fourchette being in alinement with the notch in the forward edge and spaced therefrom, a portion of the fourchette extending over the palm portion and the other portion thereof extending over the back portion, and a thumb piece stitched to the single half fourchette and the back and palm portions, respectively.

In testimony whereof we affix our signatures in the presence of two witnesses.

CHARLES E. CHADDOCK.
RICHARD G. CHADDOCK.

Witnesses:
HOWARD W. CHRISTMAN.
ALBERT D. WISMAR.